(12) United States Patent
Burkhard et al.

(10) Patent No.: US 6,923,449 B2
(45) Date of Patent: Aug. 2, 2005

(54) BAFFLE SEAL WITH REMOVABLE RING ELEMENT, AND BALANCE EQUIPPED WITH THE BAFFLE SEAL

(75) Inventors: Hans-Rudolf Burkhard, Wila (CH); Luzi Hess, Zürich (CH); Willi Graf, Greifensee (CH)

(73) Assignee: Mettler-Toledo GmbH, Greifensee (CH)

( * ) Notice: Subject to any disclaimer, the term of this patent is extended or adjusted under 35 U.S.C. 154(b) by 128 days.

(21) Appl. No.: 10/267,184

(22) Filed: Oct. 9, 2002

(65) Prior Publication Data

US 2003/0067119 A1 Apr. 10, 2003

(30) Foreign Application Priority Data

Oct. 9, 2001 (DE) .......................... 101 49 606

(51) Int. Cl.[7] .......................... F16J 15/447; G01G 21/28
(52) U.S. Cl. .......................... 277/412; 277/419; 177/180; 220/374
(58) Field of Search .......................... 277/412, 418–420; 177/180; 220/374

(56) References Cited

U.S. PATENT DOCUMENTS

| | | | | |
|---|---|---|---|---|
| 1,257,553 A | * | 2/1918 | Vogt ........................... | 177/135 |
| 1,499,461 A | * | 7/1924 | Kruppa ........................ | 220/374 |
| 1,558,146 A | * | 10/1925 | Craig ........................... | 177/188 |
| 1,591,591 A | * | 7/1926 | Waderlow .................... | 220/303 |
| 1,878,205 A | * | 9/1932 | Ulrich ......................... | 177/187 |
| 2,541,862 A | * | 2/1951 | Cunningham ................ | 177/180 |
| 3,166,133 A | * | 1/1965 | Hall et al. .................... | 177/135 |
| RE27,234 E | * | 11/1971 | Smieja ........................ | 177/146 |
| 3,848,688 A | * | 11/1974 | Kloppenstein .............. | 177/179 |
| 4,320,809 A | * | 3/1982 | Knothe et al. ............... | 177/243 |
| 4,337,875 A | * | 7/1982 | Lyons ......................... | 220/368 |
| 4,392,584 A | * | 7/1983 | Bauer .......................... | 220/374 |
| 4,609,061 A | * | 9/1986 | Jacobsson .................... | 177/180 |
| 4,673,048 A | * | 6/1987 | Curran ........................ | 177/146 |
| 4,729,491 A | * | 3/1988 | Jensen et al. ................ | 220/288 |
| 5,509,949 A | * | 4/1996 | Gluys et al. ................. | 55/385.3 |
| 6,170,832 B1 | * | 1/2001 | Ernst .......................... | 277/412 |

FOREIGN PATENT DOCUMENTS

| | | |
|---|---|---|
| DE | 1741431 | 3/1957 |
| DE | 1855959 | 8/1962 |
| DE | 2019653 | 11/1970 |
| DE | 3205799 | 8/1988 |
| EP | 0232963 | 8/1987 |
| EP | 1146322 | 10/2001 |

* cited by examiner

*Primary Examiner*—Alison K. Pickard
(74) *Attorney, Agent, or Firm*—Friedrich Kueffner

(57) ABSTRACT

A baffle seal at the opening (31) for the load-transmitting member (20) in a balance housing (30) has at least one sleeve-shaped ring element (11, 110), fastener means (23) attached to the housing (30) and serving to hold the sleeve-shaped ring element in a stationary working position surrounding the opening, and a cover cap (1) with at least one sleeve-shaped ring (10, 10', 12) that is axially movable relative to the sleeve-shaped ring element. The ring element is releasable so that it can be separated from the balance without dismantling other parts.

14 Claims, 5 Drawing Sheets

BAFFLE SEAL WITH REMOVABLE RING ELEMENT, AND BALANCE EQUIPPED WITH THE BAFFLE SEAL

BACKGROUND OF THE INVENTION

The invention relates to a baffle seal (also referred to as labyrinth seal) for use in a balance. Baffle seals of this kind have one or more sleeve-shaped ring elements in a stationary position around an opening in a housing that is to be sealed, and a cover cap with one or more sleeve-shaped rings that is axially movable in relation to the one or more sleeve-shaped ring elements. In particular, a balance with the baffle seal has a force-transmitting member reaching through the housing for the introduction of the weighing load. Beyond the baffle seal itself, the invention also relates to a balance that is equipped with a baffle seal meeting the foregoing description.

Baffle seals are often used to seal the housings of machines or instruments in which a force- or torque-transmitting mechanical element extends through an opening in the housing. The use of baffle seals in roller bearings is known, e.g., from Dubbel, Taschenbuch für den Maschinenbau, 17. Auflage, Springer-Verlag, Berlin 1990, page G87, to prevent dirt from entering as well as to prevent lubricant from escaping. As FIG. 31a of the reference just mentioned illustrates, a baffle seal consists of two seal parts, where each part has at least one tubular ring and the rings are slid over each other, arranged concentrically with the opening of the housing. This arrangement creates a narrow baffled air path which allows a friction-free axial or rotary movement of the two seal parts in relation to each other and which prevents at the same time that substances could enter into or escape from the housing that is to be sealed.

The drawing FIG. 1 attached hereto shows a part of a balance with a housing 30. Extending through an opening 31 of the housing, the balance has a transmitting member 20 that is axially movable inside a body 40 and serves to transmit a force originating from a weighing load to the measuring cell of the balance. Above the opening 31, a body 40 is arranged with a device 42 that functions to elastically expand the circumference. The illustrated arrangement, which is the subject of the European Patent Application EP A 1 146 322, has a cover cap 1 in the shape of an inverted cup that is set on a load button 13 of a hub element 21. The latter transmits the weight force to a conical peg 22 that is coupled to the measuring cell.

The cover cap 1 has a sleeve-shaped or tubular-shaped outer ring 10 as well as a sleeve-shaped or tubular-shaped inner ring 12. The outer ring 10 and inner ring 12 run coaxial, have different diameters and, consequently, define a hollow-space 14 between each other. A cup-shaped sealing cap 2 is arranged in a stationary position concentric to the opening 31 of the housing 30. The sealing cap 2 has a ring element 110 directed towards the cover cap 1 and dimensioned with an appropriate diameter so that, with the cover cap 1 set in place, the ring element 110 extends into the hollow space 14 and thereby forms a baffled air path 100 that undulates up and down resembling a concentric wave pattern.

For the cleaning of the balance, it would often be desirable if the baffled air path 100 could be completely closed off. Particularly in automated weighing processes, it would furthermore be advantageous if the force-transmitting member 20 could be arrested, so that the measuring cell would not be subjected to unwanted forces during breaks in the measuring process.

In the illustrated arrangement of FIG. 1, the two functions of closing the baffled air path and arresting the force-transmitting member are performed advantageously by a device 42 that surrounds the body 40 and resembles an inflatable tire which can be expanded as well as returned from the expanded state in a controlled manner. In the expanded condition, the tire-shaped device 42 presses against the inner ring 12 of the cover cap 1, whereby the baffled air path 100 is tightly closed off and the cover cap 1 is immobilized. After the air path 100 has been closed off in this manner, the balance can be cleaned with a jet of water or compressed air without risking that dirt, water, or residues of weighed substances could enter the housing 30 through the baffled air path 100. At the same time, the transmitting member 20 is immobilized, so that load fluctuations cannot be transmitted to the measuring cell of the balance.

The cover cap 1 can be taken off to expose the parts underneath for cleaning. However, as can be clearly seen in FIG. 1, the space 15 between the tire-shaped device 42 and the ring element 110 of the stationary sealing cap 2 is hardly accessible, so that residues accumulated in the space 15 are hard to remove. Likewise, residues settled between the sealing cap 2 and the housing 30 are difficult to remove. Furthermore, the way in which the sealing cap 2 is installed makes the entire arrangement relatively expensive to manufacture.

OBJECT OF THE INVENTION

The present invention therefore has the objective to provide an improved baffle seal. A further objective is to provide a balance equipped with a baffle seal of the kind that has been referred to at the beginning, but configured in particular to facilitate quick and thorough cleaning of the balance in the area of the baffle seal.

SUMMARY OF THE INVENTION

The baffle seal according to the invention serves to seal an opening in a housing of the kind that is found, for example, in a balance with a measuring cell for the passage of a transmitting member that is arranged with axial mobility in the opening. The baffle seal according to the invention consists of at least one tubular section or sleeve-shaped ring element that surrounds the passage opening and is attached to the housing. In addition, the baffle seal consists of at least one sleeve-shaped ring that is part of a cover cap, where the cover cap is axially movable in relation to the aforementioned ring element. In the case of a balance, the cover cap may be configured as a weighing pan that can be set on the force-transmitting element. According to the invention, fastener means are attached to the housing at stationary locations, serving to releasably fasten the at least one tubular-shaped or sleeve-shaped ring element. Thus, the ring element which is fixed in the stationary position is a releasable ring element. The stationary ring element and the at least one tubular-shaped or sleeve-shaped ring of the cup-shaped cover cap together form the baffle seal.

The cup-shaped cover cap, which is preferably configured so that it can be set on and also taken off from the force-transmitting member, and which is preferably equipped with an outer ring and an inner ring, therefore forms the first part of the baffle seal, while the releasable ring element forms the second part of the baffle seal.

Thus, after removing the cup-shaped cover cap and the releasable ring element, the fastener means are the only part of the baffle seal that remains in place. Consequently, in the case of a balance, other parts of the unit such as in some cases a body with an expandable device become easily accessible for a quick and thorough cleaning.

The inventive concept can be used to particular advantage in balances that are used for manual or automated weighing of toxic substances. Balances or weighing systems of this kind have to be cleaned either at periodic intervals or when necessary, in order to prevent or remove even the smallest accumulation of residues of substances to which operators or service workers could become exposed. The baffle seal according to the invention allows spray-cleaning under test conditions as specified under International Protection Class IP65 according to International Electric Code IEC 529. In addition, the inventive concept under which the stationary ring element can be removed and reinstalled through a simple, one-handed operation allows a thorough and fast cleaning of the parts of the balance that are on the outside of the housing. Thus, the balance can be maintained in optimal condition, and the required cleaning causes only short interruptions.

In preferred embodiments of the invention, the fastener means are preferably configured as small segments of a simple shape, equipped with clamping elements, projections, or screw-thread sections that engage a groove on the inside of the tubular- or sleeve-shaped ring element to hold the latter firmly in place. As another conceivable fastener means, one might also consider a screw that is inserted radially through the ring element into a flange-like projection surrounding the opening of the housing. However, according to the invention it is preferred to use fastener means that do not require additional parts and which, furthermore, can be released without a tool.

In a preferred embodiment of the invention, the fastener means are connected to the body that surrounds the force-transmitting member and are arranged in the form of segments adjoining a circle that is defined by the tubular- or sleeve-shaped releasable ring element, so that the surface of the balance housing prior to the installation of the body can be perfectly flat and therefore easy to clean. However, the fastener means can also be connected to the housing or integrally shaped on the housing.

Preferably, the ring element, which is made of a metal such as a chromium steel, or of a polymer material, is designed to elastically change its cross-sectional shape under manual pressure so that the engagement between the ring element and the fastener means can be released or restored by a simple one-handed movement.

In a particularly advantageous embodiment, the mutually engaged portions of the fastener means and the groove in the ring element have mating surface profiles that are preferably shaped so that the releasably installed ring element, while being in elastic pressure contact with the fastener means, is pulled preferably towards the housing into a predetermined position where the ring element is firmly held in place.

BRIEF DESCRIPTION OF THE DRAWING

In the following, the invention will be discussed in more detail on the basis of the attached drawings, wherein:

FIG. 5b represents a detail of FIG. 5a;

FIG. 8 illustrates an arrangement analogous to FIG. 1 with an inventive baffle seal according to FIG. 5a;

DESCRIPTION OF PREFERRED EMBODIMENTS

Figure 1:
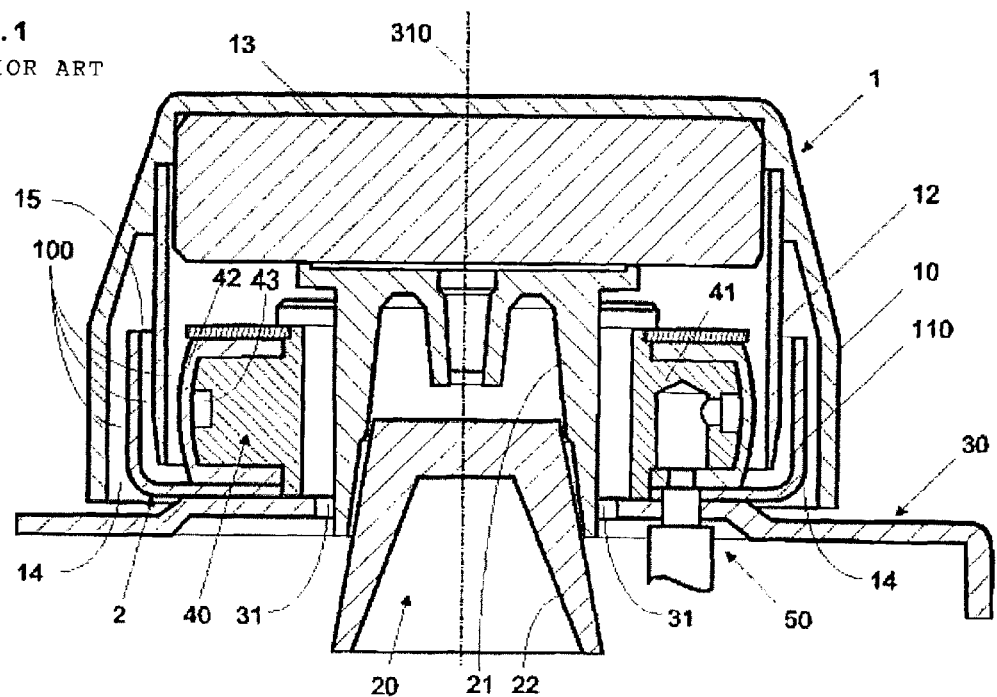
FIG. 1 shows a sectional view in a plane containing the axis of an opening in a balance housing equipped with a baffle seal, where an axially movable transmitting member with a cup-shaped cover cap reaches through the opening to introduce the weighing force into the balance.

FIG. 1 schematically illustrates a portion of a balance that is arranged in a housing 30 and has a mechanical part or, more specifically, a transmitting member 31 that is movable in the direction of its axis 310 and serves to transmit a force generated by a weighing object to the measuring cell of the balance. This arrangement, which has already been described above in the introductory paragraphs, includes a cup-shaped cover cap 1 that is set onto a load button 13 that is connected to a hub element 21. A force applied to the cover cap is transmitted by the hub element 21 to a conically shaped peg 22 of the load receiver of the balance.

The cover cap 1 has a sleeve-shaped or tubular-shaped outer ring 10 and a sleeve-shaped or tubular-shaped inner ring 12 dimensioned with different diameters, extending coaxially and delimiting a ring-shaped hollow space 14 between the outer and inner ring. A cup-shaped sealing cap 2 is arranged in a fixed position concentric to the opening 31 of the housing 30. The sealing cap 2 has a ring element 110 directed towards the cover cap 1 and dimensioned with an appropriate diameter so that, with the cover cap 1 set in place, the ring element 110 extends into the hollow space 14.

The cover cap 1 can be taken off for the cleaning of the parts of the device that lie underneath the cover cap. As described in the introductory paragraphs, the space in the area of the stationary sealing cap 2 is difficult to reach, so that residues accumulated in that area are hard to remove.

Figure 3:
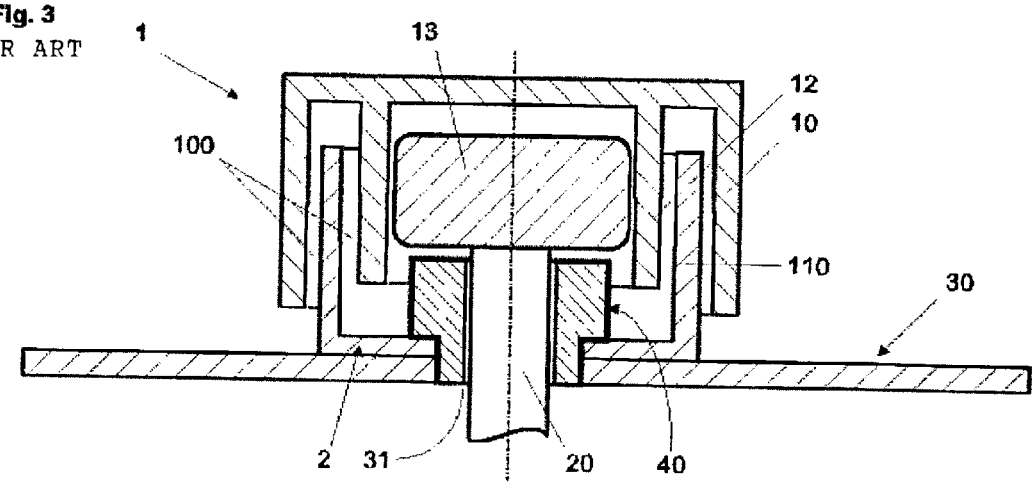
FIG. 3 schematically represents the baffle seal used in the arrangement of FIG. 1.

FIG. 3 schematically illustrates the baffle seal used in the arrangement of FIG. 1, where the rings 10, 12 of the cover cap 1 together with the ring element 110 define a baffled air path 100. The force-transmitting member 20 as well as the body 40 surrounding the force-transmitting member 20 and the opening 31 are shown only in a symbolic manner. As can further be seen, the sealing cap 2 is held firmly between the housing 30 and the body 40, so that the sealing cap 2 cannot be removed for the cleaning of the device.

Figure 4:
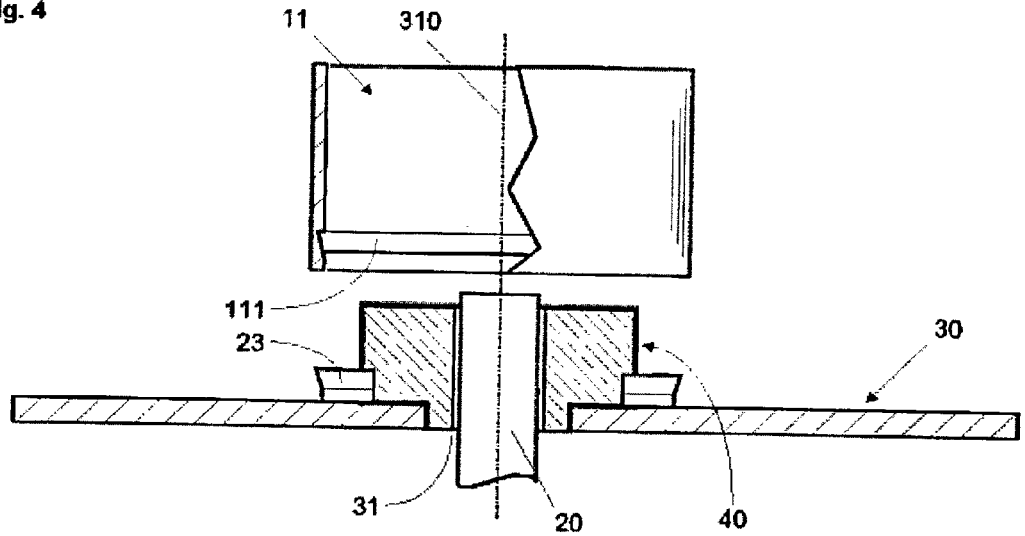
FIG. 4 schematically represents a releasably installed tubular-shaped or sleeve-shaped ring element that forms part of a baffle seal according to the invention, with the associated fastener means.

In schematic form and not true to scale, FIG. 4 shows a body 40 connected to the housing 30 as well as a tubular-shaped or sleeve-shaped ring element 11 that is made, e.g., from a section of tubular-shaped stock and designed so that it can be set on the housing 30 and releasably connected to the latter with fastener means 23. The ring element 11 has on its inside a groove 111 running in a closed circle in a horizontal plane around the vertical axis of the ring element 11. The groove 111 is positioned so that in the installed condition, the end of the ring element 11 that carries the groove is resting against the housing. Fastener means 23 are connected directly or indirectly to the housing 30 and engage the groove 111 when the releasable ring element 11 is set in place (see FIGS. 5a and 5b), to hold the releasable ring element 11 in position or, as a preferred concept, push the releasable ring element 11 downward against the housing 30. The groove 111 is therefore set at such a distance from the lower rim of the releasable ring element 11 that in the installed condition of the latter, there is a gap-less connection between the releasable ring element 11 and the housing 30.

Figure 5A:
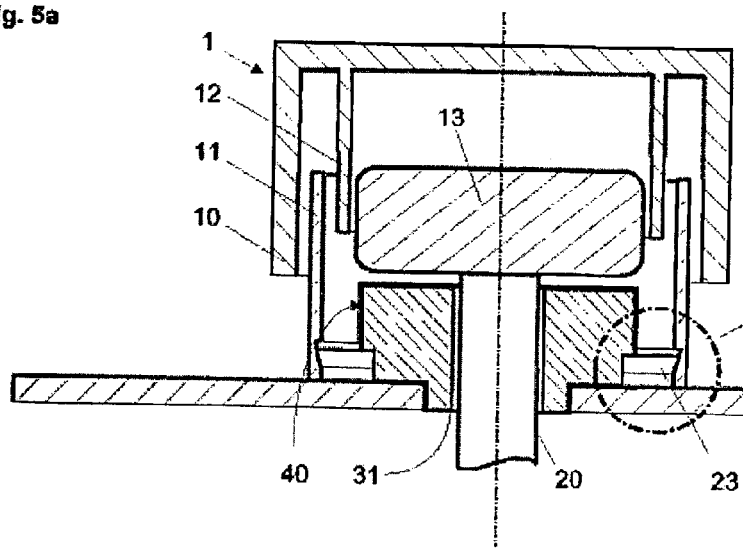
FIG. 5a schematically represents a baffle seal according to the invention with the releasable ring element of FIG. 4 installed and the cup-shaped cover cap set in place.

FIG. 5a shows the releasable ring element 11 in the installed position and the cover cap 1 in a halfway lifted-off position.

Figure 6:
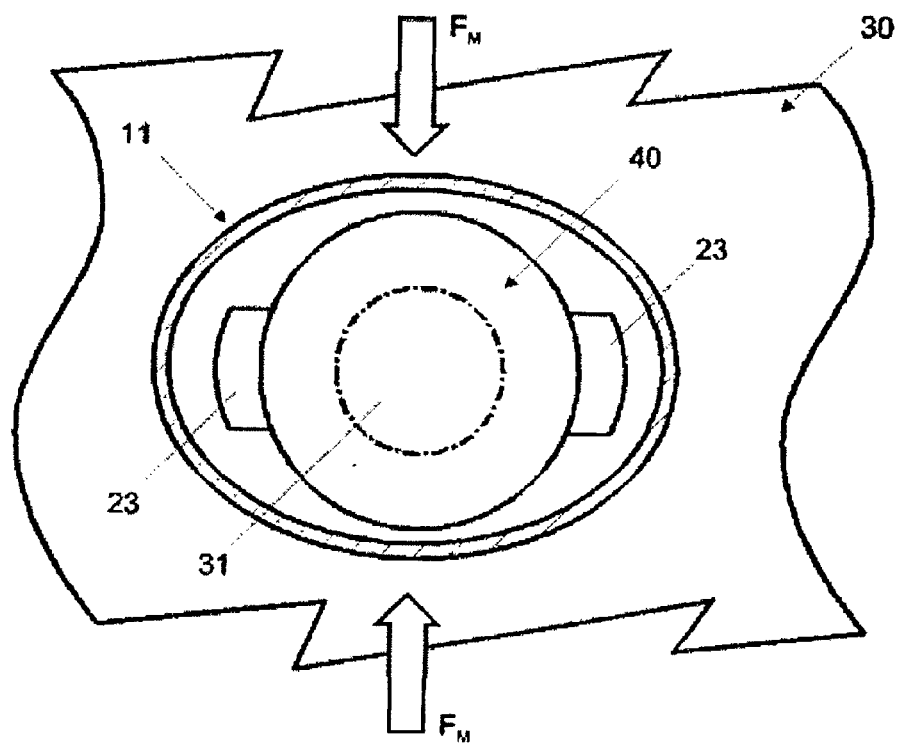
FIG. 6 illustrates the releasable ring element of FIG. 4 seen from above in the process of being installed.

FIG. 6 shows the releasable ring element 11 in a preferred embodiment, as seen from above during the process of installation. The illustrated example of FIG. 6 has two segments 23 to fasten the releasable ring element 11. The two segments are located on diametrically opposite sides in relation to the opening 31 of the housing 30, at a distance from each other that is compatible with the inside diameter of the releasable ring element 11, so that the clamping elements, projections, or screw-thread sections that are provided on the segments 23 can engage the groove 111.

It is preferred to use two segments 23 as a fastener means, without excluding the possibility of using additional segments 23 in an appropriate arrangement.

Figure 7:
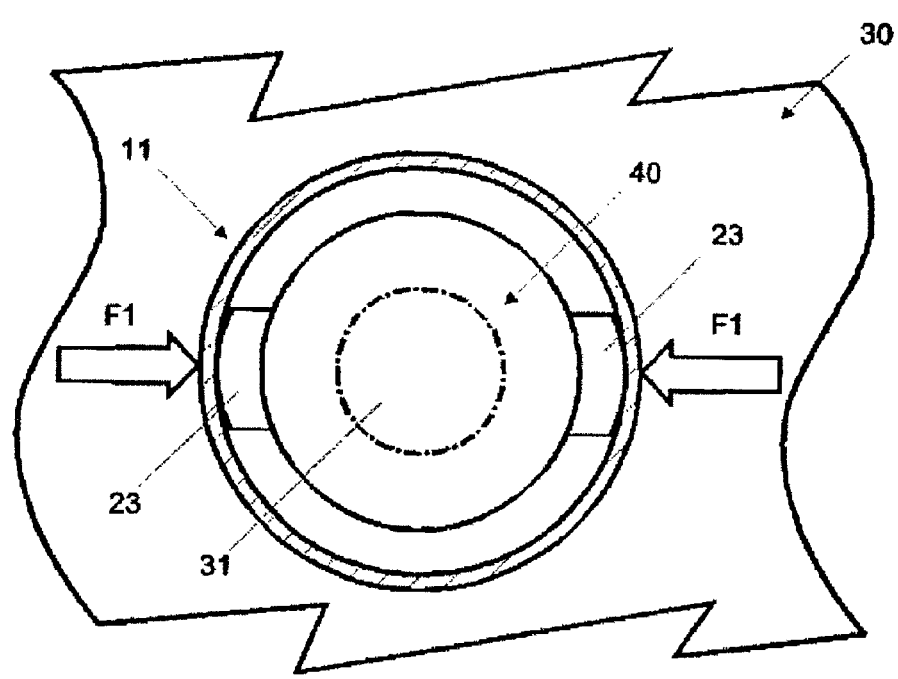
FIG. 7 illustrates the releasable ring element of FIG. 4 seen from above in the installed condition.

The releasable ring element 11 in FIG. 6 is made of an elastic material, preferably of chromium steel but not excluding other metals or polymer materials, and its cross-sectional shape is easily deformable. To install or remove the releasable ring element 11, its cross-sectional shape is changed into an ellipse by applying a manual force $F_M$. After the releasable ring element 11 has been set in place and the manual forces $F_M$ have been removed, the releasable ring element 11 because of its elasticity returns to its original shape as shown in FIG. 7. In this condition, the ring element 11 pushes against the segments 23 with a force $F_1$, so that the fastener elements engage the groove 111 as shown in FIG. 5b.

Figure 5B:
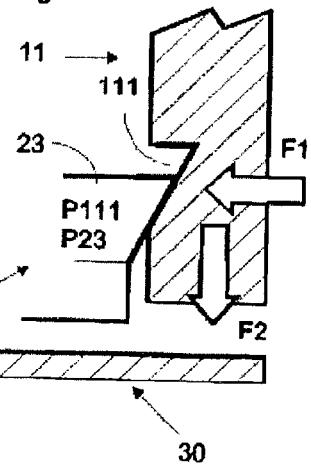

In the preferred embodiment of the invention that is shown in FIG. 5b, the mutually engaged portions of the fastener means 23 and the groove 111 have mating profiles P23, P111, respectively, which are shaped so that the releasably installed ring element, while being in elastic pressure contact with the fastener means 23, is pulled into a predetermined position, preferably towards the housing 30, where the ring element is firmly held in place. In the schematic representation of FIG. 5b, the profiles P23, P111 have inclined surfaces, so that a component $F_2$ of the compressive contact force pushes the releasable ring element 11 in the downward direction. In practice, the profiles P23 and P111 are preferably made without sharp corners and edges, using a more rounded shape instead.

If the releasable ring element 11 and the fastener means 23 have screw-thread elements, the ring element 11 can be screwed onto the fastener means. In this case, the fastener means 23 could be configured as a screw thread running around the circumference of the body 40.

Figure 8:
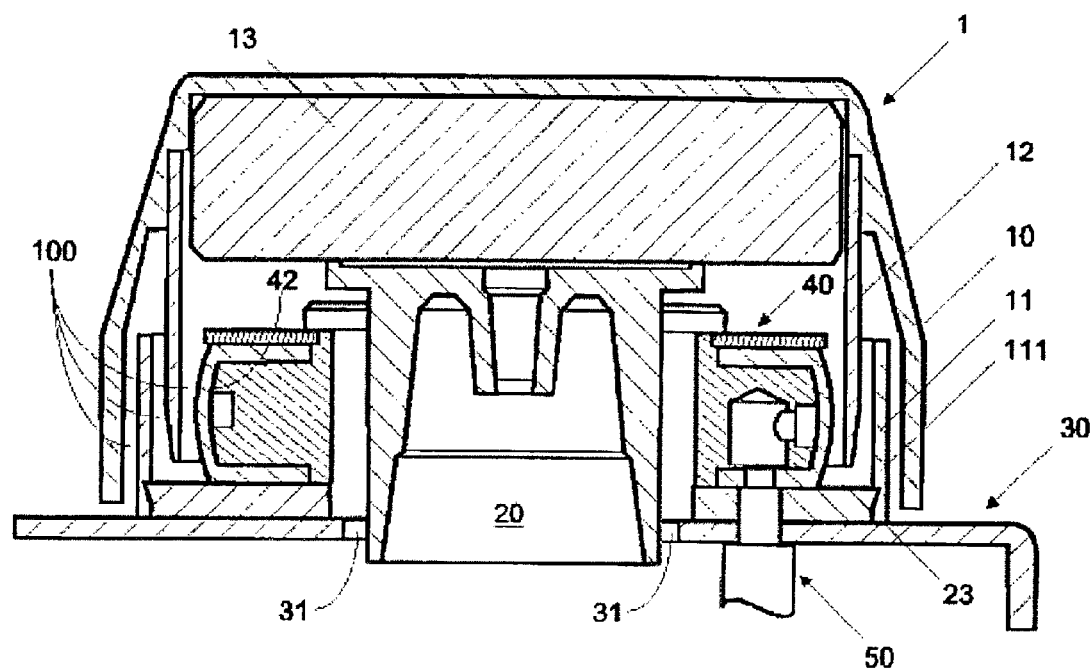

FIG. 8 illustrates the arrangement of FIG. 1 equipped with the inventive baffle seal according to FIG. 5a. The fastener means 23 in the illustrated embodiment are connected to the body 40 that carries the circumference-expanding device.

Figure 9:
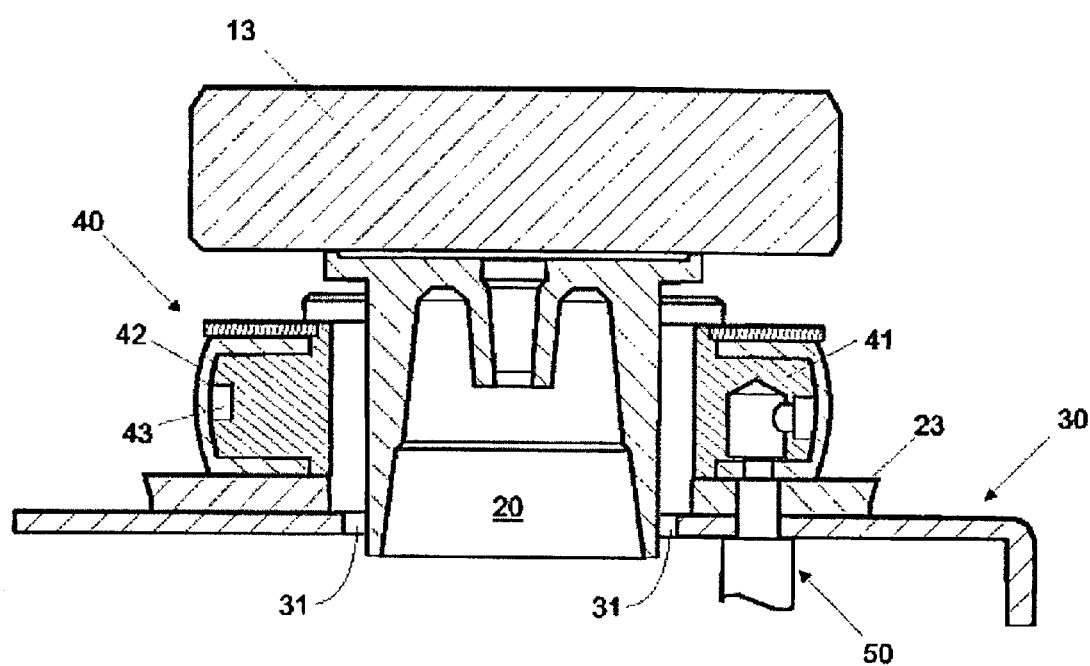
FIG. 9 illustrates the device of FIG. 8 with the cover cap taken off and the ring element removed.

FIG. 9 shows the arrangement of FIG. 8 with the cover cap and the ring element 11 taken off. By comparing this arrangement to FIG. 1, it is readily apparent that after removing the releasable ring element 11, nothing stands in the way of cleaning the device according to the invention, in contrast to the arrangement of FIG. 1 where essential parts are hardly reachable.

However, the arrangements of FIG. 1 and FIG. 8 still share the same design of the body 40. In the illustrated embodiment, the body 40 includes a toroidal-shaped element 41 with a channel groove 43 on the outside. The toroidal-shaped element 41 is covered by a tire-shaped elastic device 42, which can be expanded and contracted by adding or evacuating a fluid in the channel groove 43. By expanding and contracting the device 42, preferably under electronic control, the baffled air path 100 can thus be selectively closed and reopened, and the cover cap can be arrested as well as released from the arrested condition.

After closing off the baffled air path 100, the balance can be cleaned, e.g., with a jet of water or compressed air, without the risk that dirt, water, or residues of measurement samples could penetrate the housing 30 through the baffled air path 100. At the same time, the cover cap 1 is immobilized while leaving a free play between the cover cap and the transmitting member 20, so that no load fluctuations can be transmitted to the measuring cell of the balance.

Figure 2:
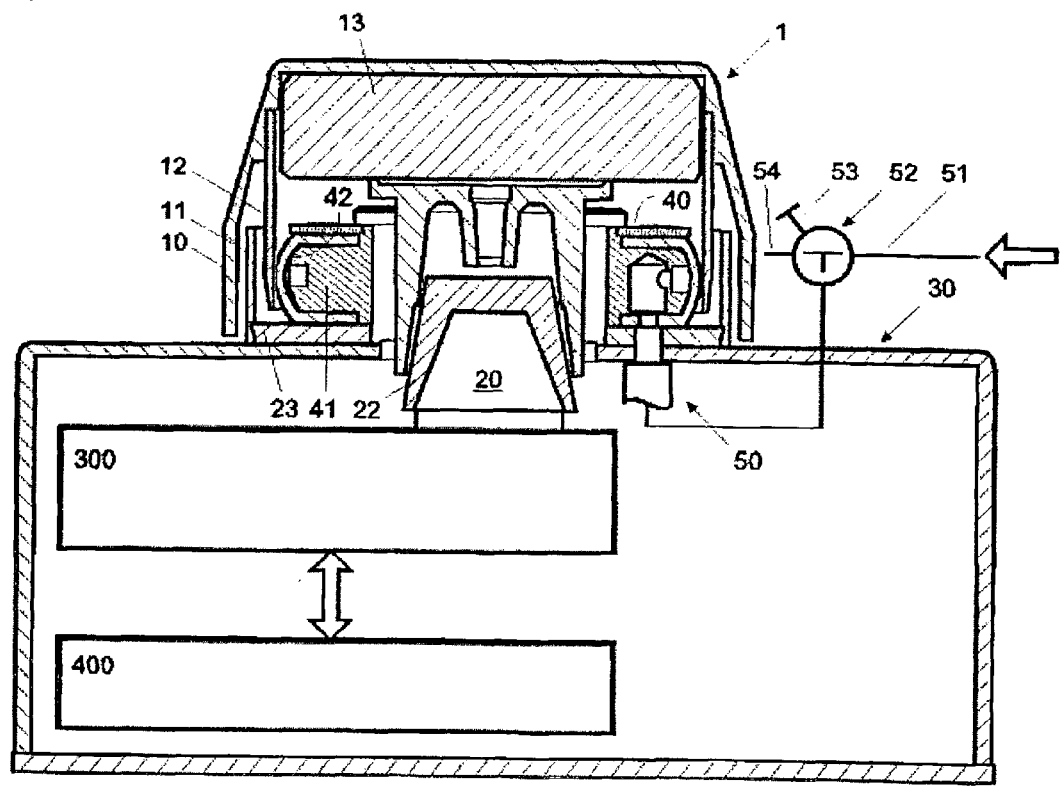
FIG. 2 represents a balance according to the invention equipped with the inventive baffle seal of FIG. 8.

In its expanded condition, the tire-shape device 42 in the embodiment of FIG. 8 bears against the inner ring of the cup-shaped cover cap 1 (see FIG. 2). In case the device 42 is expanded when the cover cap 1 has been taken off, the releasable ring element 11 will protect the tire-shaped device 42 from being over-stretched.

The fluid is introduced or evacuated manually or automatically through a pressure conduit 51, controlled by a valve 52. As shown in FIG. 2, the valve 52 is equipped, e.g., with a manually operated device 53 which permits fluid to be introduced through the pressure conduit 51 into the tire-shaped device 42 and to be drained from the tire-shaped device 42 through an outlet conduit 54.

FIG. 2 gives a schematic view of a balance according to the invention that is equipped with the arrangement of FIG. 8. The balance can, e.g., be arranged as a conveyor scale below a weighing section of a conveyor belt and have a tightly enclosed housing 30 that is easy to clean. The balance housing 30 contains a measuring cell 300 of a type that is known per se (see, e.g., U.S. Pat. No. 4,489,800) in connection with an electronic circuit module 400. The force-transmitting member 20 with the cup-shaped cover cap 1 rises above the housing 30 as an axially movable part that reaches through the body 40 and transmits a force originating from a weighing object to a load receiver that is connected to the weighing cell 300.

Figure 10:
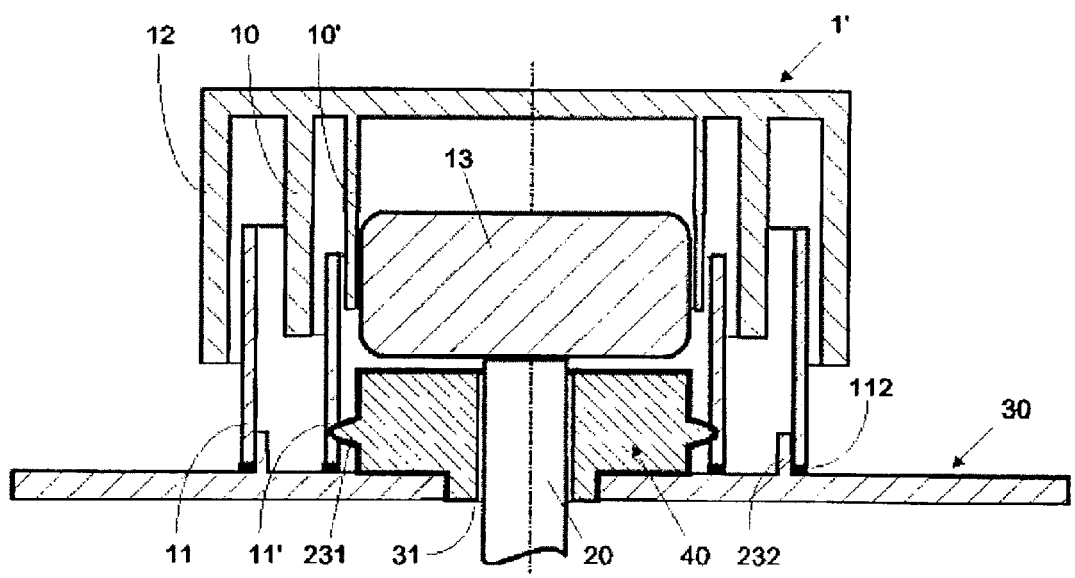
FIG. 10 schematically illustrates a further embodiment of a baffle seal with two releasable ring elements that have sealing elements at the ends facing the housing.

The description of FIGS. 4 to 9 relates to preferred embodiments of the invention. However, based on the concept taught by the invention, further embodiments and adaptations of the invention may easily be found. As shown in FIG. 10, it is possible to use more than one releasable ring element 11 with an appropriately adapted cover cap 1'. The mutually corresponding designs of the groove 111 and fastener means 23 (or fastener means 231, 232 in the case of FIG. 10) can be selected from a diversity of possible configurations. The fastener means 23, 231, 232 can be connected to the body 40 or directly to the housing 30. The releasable ring elements 11 can further be connected with seal rings 112.

The inventive baffle seal with releasable ring elements 11 can also be used in other instruments or machines, with appropriate adaptations if necessary. The cover cap 1, shown in the shape of an inverted cup in the drawings, can also be configured in some other shape to serve a particular purpose. The cover cap 1 can also be attached to the force-introducing part through an easily releasable connection.

The fastener means 23, 231, 232 could further be configured to engage a groove or a thread on the outside of the releasable ring element. The releasable ring element could further be provided with grooves or threads on both the inside and the outside. Individuals of ordinary skill in the relevant art will without further instruction be in a position to make these and similar modifications of the inventive concept.

What is claimed is:

1. A baffle seal, adapted for use in a device in which a transmitting member (20) reaches through an opening (31) of a housing (30) for the introduction of a force, said baffle seal comprising at least one sleeve-shaped ring element (11, 110), fastener means (23) fixedly connected to a top surface of the housing (30) for holding the sleeve-shaped ring element in a stationary working position surrounding said opening, and a cover cap (1) with at least one sleeve-shaped ring (10, 10', 12) that is axially movable relative to the sleeve-shaped ring element; wherein the ring element is releasable from the fastener means so that the ring element can be separated alone from said working position, further comprising a body (40) surrounding and protruding from the opening (31).

2. The baffle seal according to claim 1, wherein the ring element (11) has one end facing towards the housing and, at said one end, is in a substantially tight contact with the housing (30).

3. The baffle seal according o claim 2, further comprising a seal ring (112) interposed between said one end of the ring element (11) and the housing (30).

4. The baffle seal according to claim 1, wherein the fastener means (23) are segment-shaped and are tangent to a circular arc defined by the releasable ring element (11).

5. The baffle seal according to claim 4, wherein the releasable ring element (11) elastically yields to manual pressure in such a manner that the releasable ring element (11) changes its cross-sectional shape and is thereby enabled to be released from the fastener means (23) or to be connected to the fastener means (23).

6. The baffle seal according to claim 5, wherein a groove (111) is arranged inside the ring element (11), and wherein the fastener means (23) comprise elements selected from a group consisting of clamps, projections, and screw-threads, said elements being operable to engage the groove (111) to hold the ring element (11) in place.

7. The baffle seal according to claim 6, wherein the ring element (11) in an installed state exerts an elastic force against the fastener means (23), the fastener means (23) and the groove (111) have mating profiles (P23, P111) in an area where said elements engage the groove, and wherein said profiles are of such a shape that said elastic force pulls the ring element (11) into a predetermined position, preferably towards the housing (30), and holds the ring element in said predetermined position.

8. The baffle seal according to claim 1, wherein the fastener means (23) are part of the housing (30).

9. The baffle seal according to claim 1, wherein the fastener means (23) are part of the body (40) that is attached to the housing (30).

10. The baffle seal according to claim 9, wherein a baffled air path (100) is formed by the releasable ring element (11) and the at least one sleeve-shaped ring (10; 12), and wherein a controllably expandable and contracible elastic device (42) is arranged on the body (40) to perform at least one of the functions of closing and opening said baffled air path, and of arresting the cover cap (1).

11. The baffle seal according to claim 10, wherein the elastic device (42) has the shape of a tire and is operable to be expanded and to be contracted from an expanded state by changing the pressure of a fluid that is introduced into the elastic device from the outside.

12. A balance comprising: a housing (30) with an opening (31); an axially movable transmitting member (20) reaching through the opening (31) and serving to introduce a force, said transmitting member being connected to a measuring cell (300) and carrying a cover cap (1) with at least one sleeve-shaped ring (10, 12); at least one sleeve-shaped ring element (11) that is held in a working position surrounding the opening (31) by fastener means (23) that are fixedly connected to a top surface of the housing (30); wherein the ring element (11) cooperates with the at least one sleeve-shaped ring (10; 12) to form a baffle seal to seal the opening (31), and wherein the ring element (11) is releasable from the fastener means so that the ring element can be separated alone from said working position, further comprising a body (40) surrounding and protruding from the opening (31).

13. The balance according to claim 12, wherein the fastener means (23) are part of the body (40) that is attached to the housing (30).

14. The balance according to claim 12, wherein a baffled air path (100) is formed by the releasable ring element (11) and the at least one sleeve-shaped ring (10; 12), and wherein a controllably expandable and contractible elastic device (42) is arranged on the body (40) to perform at least one of the functions of closing and opening said baffled air path, and of arresting the cover cap (1).

* * * * *